Nov. 14, 1939.  K. W. HALLDEN  2,180,202
FLYING CUTTING DEVICE
Original Filed Oct. 4, 1937   6 Sheets—Sheet 1

Inventor
Karl W. Hallden
by Seymour Earle & Nichols
Attorneys

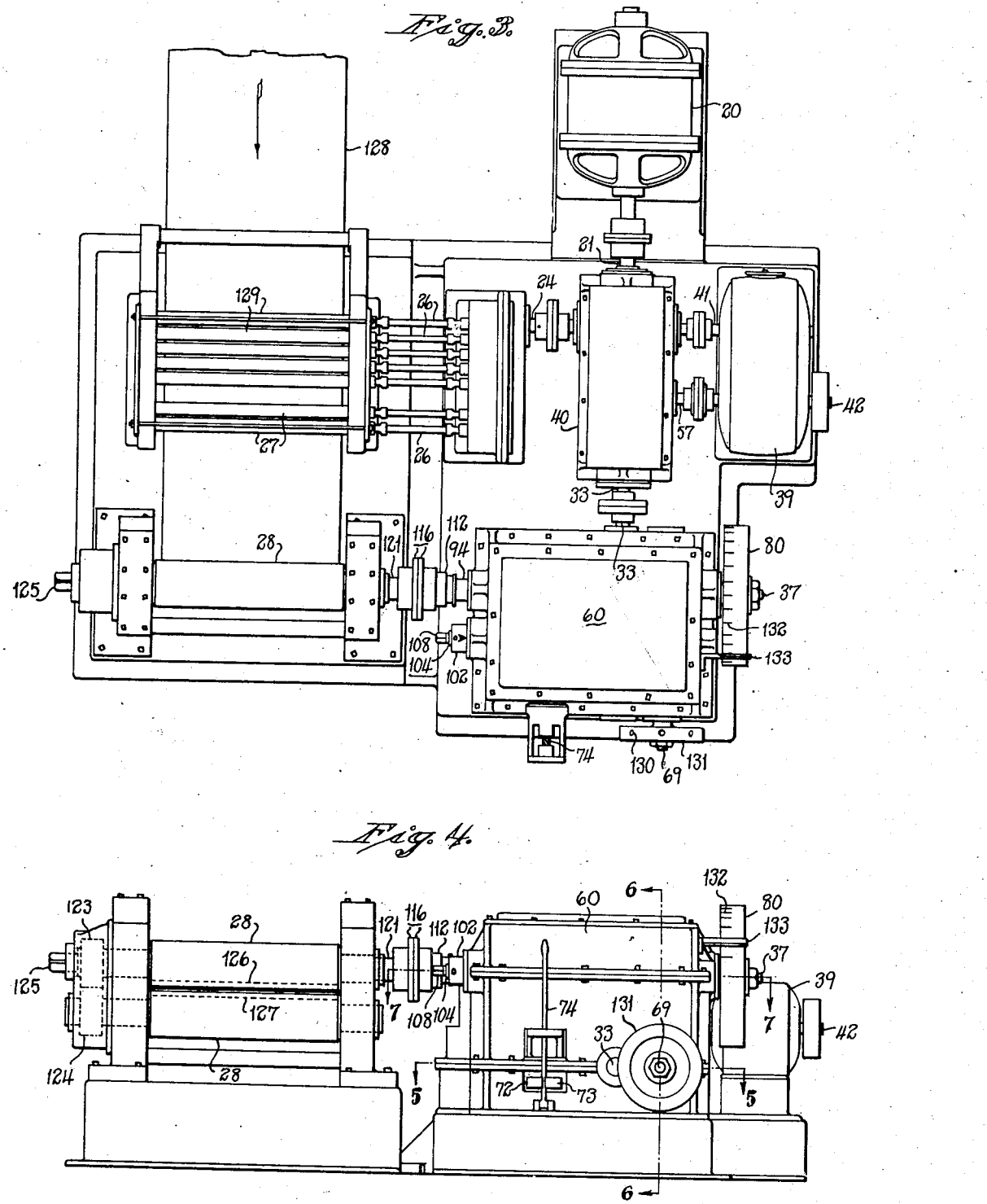

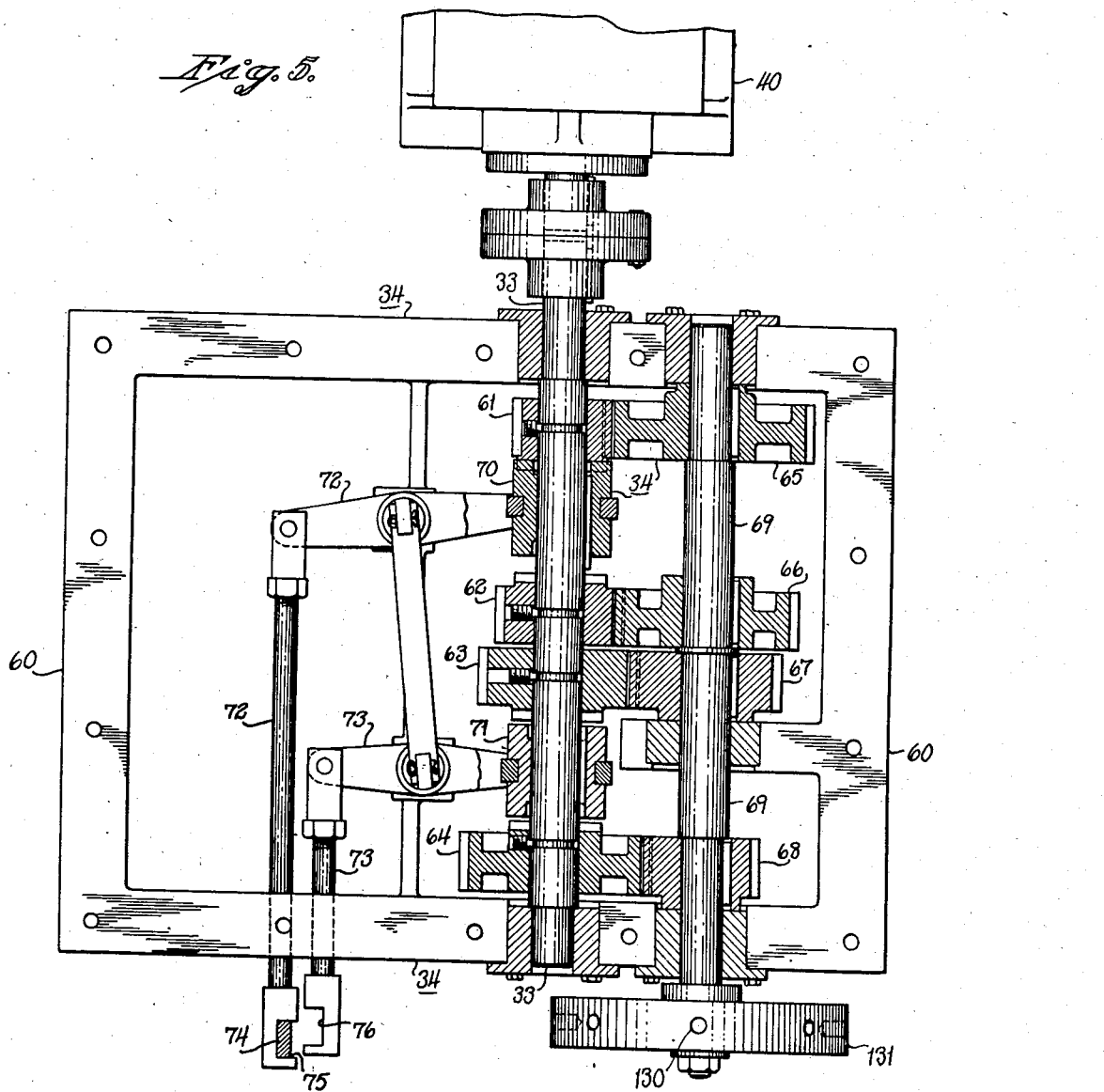

Nov. 14, 1939.  K. W. HALLDEN  2,180,202
FLYING CUTTING DEVICE
Original Filed Oct. 4, 1937   6 Sheets-Sheet 4
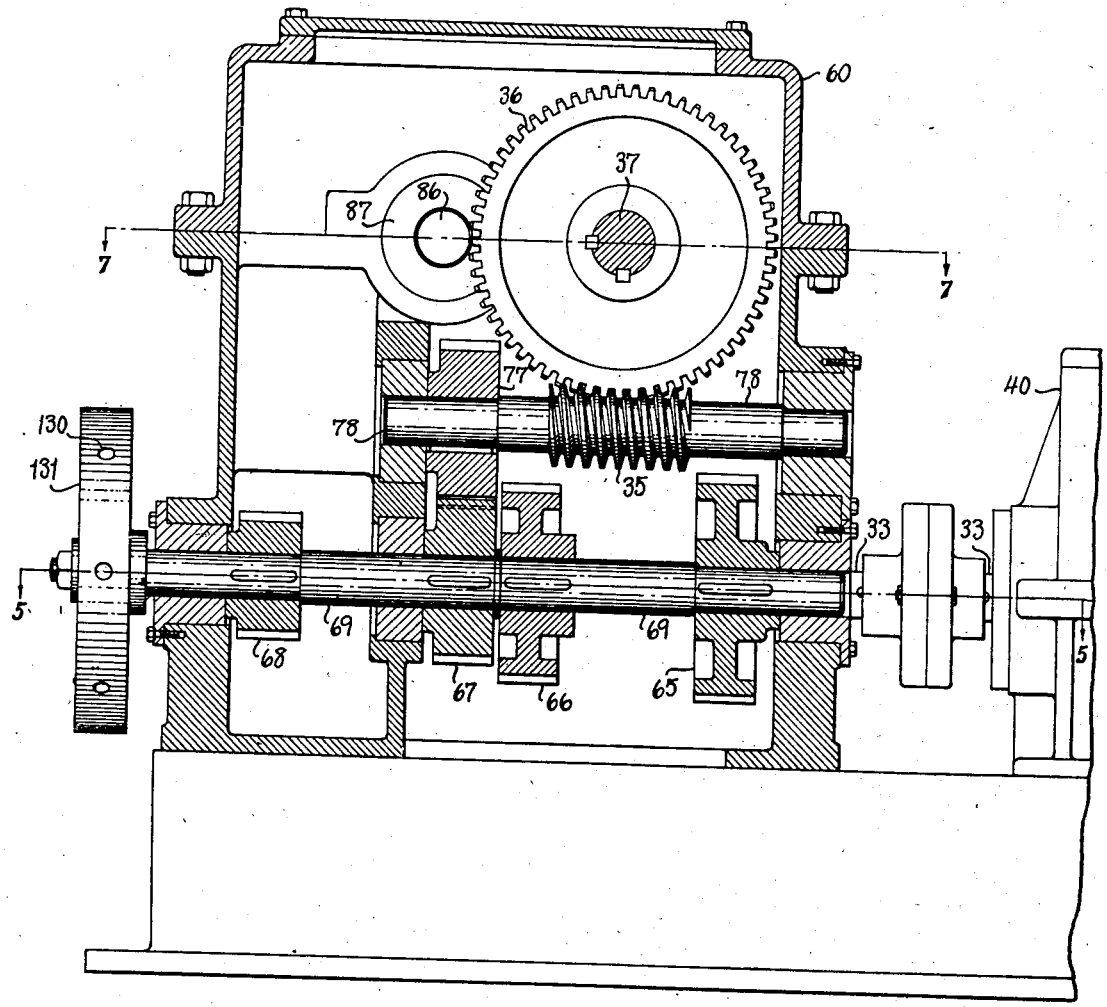
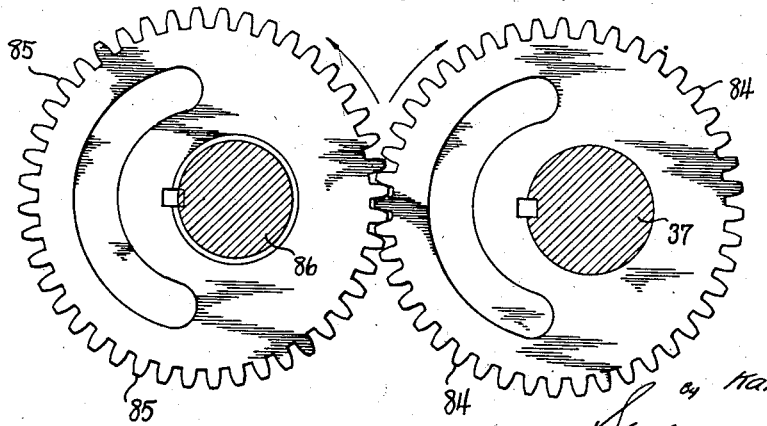
Inventor
Karl W. Hallden
Seymour Earle Nichols
Attorneys

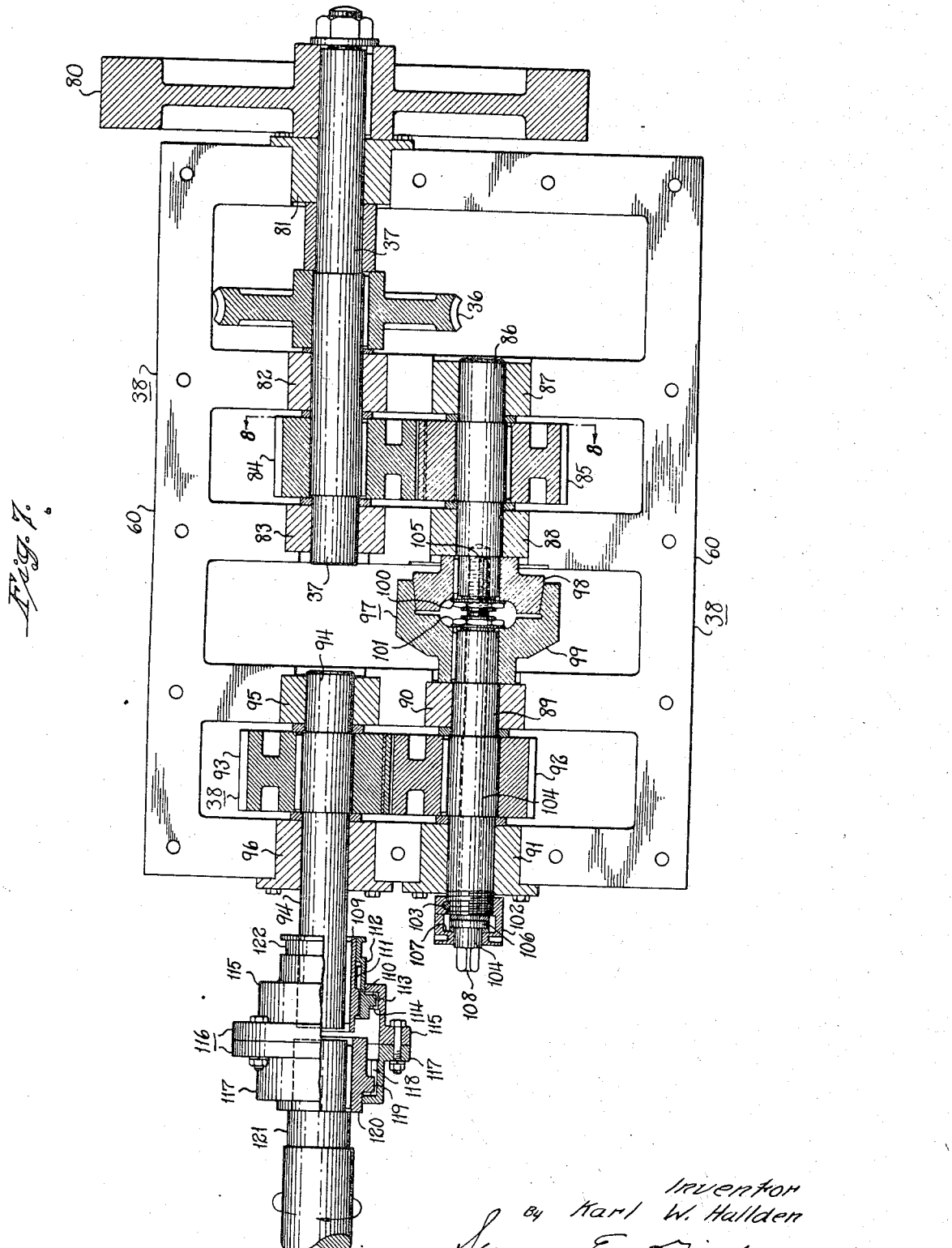

Nov. 14, 1939.  K. W. HALLDEN  2,180,202
FLYING CUTTING DEVICE
Original Filed Oct. 4, 1937   6 Sheets-Sheet 6
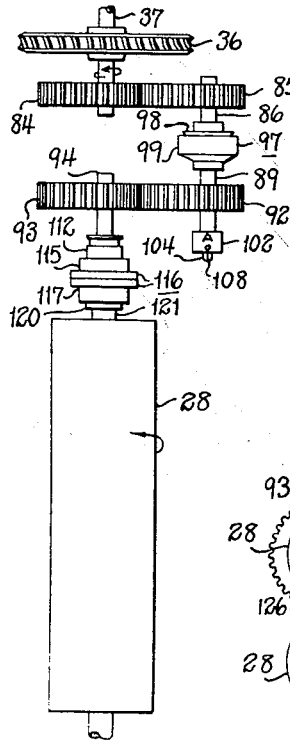
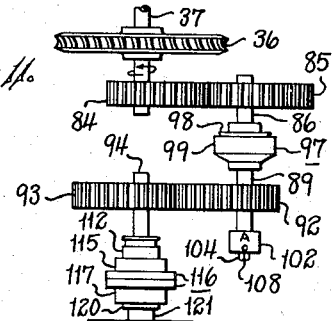
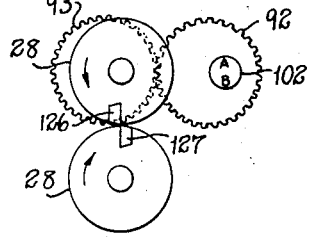
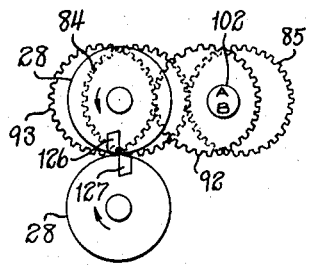
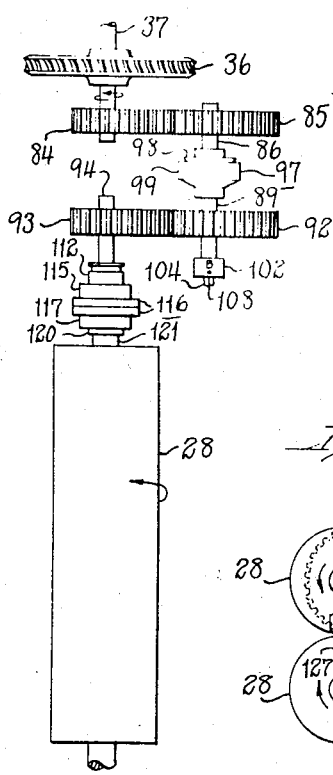
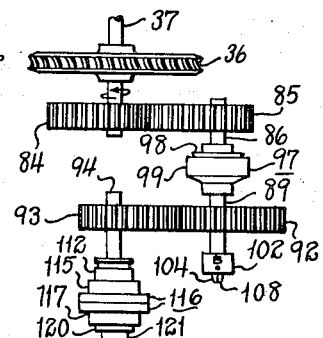
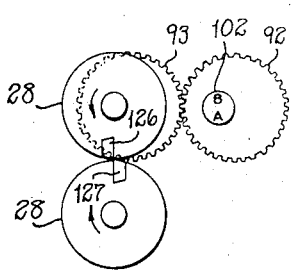
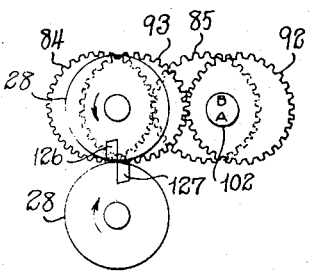
Inventor
Karl W. Hallden
By Seymour Earle & Nichols
Attorneys Patented Nov. 14, 1939

2,180,202

UNITED STATES PATENT OFFICE 2,180,202

FLYING CUTTING DEVICE

Karl W. Hallden, Thomaston, Conn.

Application October 4, 1937, Serial No. 167,192
Renewed September 29, 1939

10 Claims. (Cl. 164—68)

This invention relates to improvements in flying cutting devices, and more particularly to rotary flying cutting devices having means for synchronizing the speed of the cutters with the speed of feed of the stock, at the time of cut.

One object of this invention is to provide an improved rotary flying cutting device adapted to be adjusted, so that stock can be cut into any of various lengths while the stock is being fed, with improved adjustable means for synchronizing the speed of travel of the cutters with the speed of feed of the stock, at the time of cut.

Another object of this invention is to provide an improved rotary flying cutting device adapted to be adjusted, so that stock can be cut into any of various lengths while the stock is being fed, provided with two pairs of eccentric gears so combined as to permit of adjustment to synchronize the speed of travel of the cutters with the speed of feed of the stock, at the time of cut.

Another object of this invention is to provide an improved rotary flying cutting device adapted to be adjusted, so that stock can be cut into any of various lengths while the stock is being fed, with means for synchronizing the speed of travel of the cutters with the speed of feed of the stock at the time of cut, together with counterbalance-means to counterbalance any surge that may be present in the cutter-carriers.

Another object of this invention is to provide an improved synchronized rotary flying cutting device formed of simple elements readily manufactured and readily assembled to produce a rugged, durable mechanism.

With the above and other objects in view, as will appear to those skilled in the art from the present disclosure, this invention includes all features in the said disclosure which are novel over the prior art.

In the accompanying drawings forming part hereof, in which certain ways of carrying out the invention are shown for illustrative purposes:

Fig. 3 is a plan view of the actual mechanism, which is diagrammatically shown in Fig. 1;

Fig. 4 is a front elevation of Fig. 3;

Fig. 5 is a horizontal section on the plane indicated by lines 5—5 of Figs. 4 and 6;

Fig. 6 is a vertical section on the plane indicated by line 6—6 of Fig. 4;

Fig. 7 is a horizontal section on the plane indicated by lines 7—7 of Figs. 4 and 6;

Fig. 8 is a vertical section on the plane indicated by line 8—8 of Fig. 7;

Figures 1, 2:
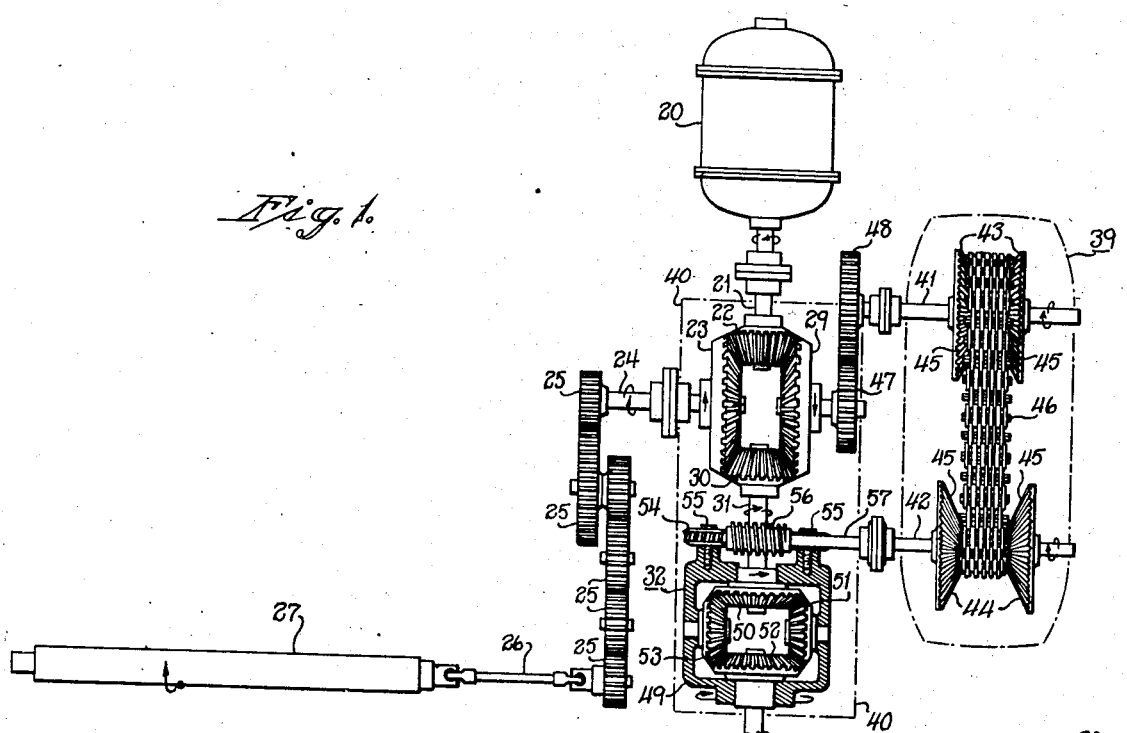
Fig. 1 is a diagrammatic plan view illustrating one embodiment of the invention in the form of a synchronized rotary flying shear, with certain parts of the mechanism spread out horizontally from their true superimposed positions, for clearness.
Fig. 2 is a view similar to Fig. 1 of a modified construction of a portion thereof.

Figs. 9, 11, 13 and 15 are plan diagrammatic views of a portion of the mechanism of Fig. 1, illustrating the synchronizing mechanism in different adjusted positions; and Figs. 10, 12, 14 and 16 are respectively end elevations of Figs. 9, 11, 13 and 15, with the worm-wheel omitted.

In the description and claims, the various parts are identified by specific names for convenience, but they are intended to be as generic in their application as the prior art will permit.

In the employment of flying cutting devices, such as the rotary flying shear illustrated in the drawings, ordinarily, the stock to be cut is fed to the cutters or shear knives at a speed to give the highest feasible rate of output of sheared lengths of stock, and ordinarily this speed of feed is constant.

In order to cut the stock into any of various lengths while it is bing fed without interruption, it is necessary to be able to vary the average angular velocity or average speed of rotation of the cutters. Thus, if the cutters are being rotated at a given average speed and with a given rate of feed of stock to accomplish a certain length of cut, then, if it is desired to cut stock into shorter lengths, it is necessary to increase the average speed of rotation of the cutters in order that they shall come into cutting relation a greater number of times in a given unit of time, thereby cutting the stock into shorter lengths. Similarly, if it is desired to cut longer lengths, the average speed of rotation of the cutters is decreased to produce a fewer number of cuts in a given unit of time, thereby accomplishing cuts of longer lengths, the speed of feed of the stock at all times being the same, to avoid damage to the stock being cut, means is provided to synchronize the speed of rotation of the cutters with the speed of feed of the stock at the instant of cut.

Referring to Fig. 1 of the drawings, the electric motor 20, through shaft 21, bevel-gears 22, 23, shaft 24, gearing 25 and coupling-bars 26, drives the feed-rolls 27 (only one of which is here shown) to feed the stock to the cutter-rolls 28.

The motor 20 drives the cutter-rolls 28 through the bevel-gears 22, 23, 29 and 30, shaft 31, differential-mechanism 32, shaft 33, gear-change mechanism or change-speed gearing 34, worm 35, worm-wheel 36, shaft 37, and synchronizing-mechanism 38.

The change-speed gearing 34 serves to give a limited number of relatively-large steps or changes in the average speed of rotation of the cutter-rolls 28, and in order to secure fine adjustment in the average speed of the cutter-rolls over the ranges intervening between the different speed-changing gears, a special infinitely-variable-speed-change unit 39 is employed. This unit 39 provides positive infinitely-variable-speed changes, and the particular unit illustrated is known as the "P. I. V.," manufactured by the Link-Belt Company, of Philadelphia, Pennsylvania.

The nest of bevel-gears 22, 23, 29 and 30, and the differential-mechanism 32, for convenience are mounted in a casing 40. The speed-change unit 39 broadly consists of two shafts 41 and 42, respectively provided with pairs of wheels 43 and 44, each having a cone face provided with teeth 45 adapted to be engaged by a special chain 46. The cone wheels of each pair are adjustable toward and from one another by suitable well-known mechanism (not shown) in order to accomplish an infinite range of variations in the speed between the shafts 41 and 42, in a well-known manner. The shaft 41 is driven from bevel-gear 29 by means of the gears 47 and 48.

The differential-mechanism 32 includes a differential-housing 49 having a nest of bevel-gears 50, 51, 52 and 53, pivotally mounted therein. A worm-wheel 54 is secured to one end of the differential-housing 49 by any suitable fastening means, such, for example, as by the bolts 55. A worm 56 is meshed with the worm-wheel 54 and is secured or formed on a shaft 57 coupled to the shaft 42 of the variable-speed unit 39.

The speed-change gearing 34 is shown in Fig. 1 as enclosed in a broken-line enclosure 58 which is horizontally displaced from the enclosure 59 containing the synchronizing-mechanism 38. This horizontal displacement of these two mechanisms is merely one of convenience for clearness of illustration in the diagrammatic showing of Fig. 1, whereas, actually the synchronizing-mechanism 38 is located above the speed-change-gearing 34 and both are contained within a casing 60, shown in Fig. 4, as will appear from Figs. 4, 5, 6 and 7. Also, in Fig. 1, parts 35, 36, 77 and 78 are shown to the right of their actual position for clearness, these parts actually being located directly above shaft 69.

As the speed-change gearing 34 and the synchronizing-mechanism 38 are more fully shown in Figs. 5, 6, 7 and 8, it will be best to refer to these figures for the detailed description of these mechanisms, to be presently given. The shaft 33 of the speed-change gearing 34 has four gears 61, 62, 63 and 64, mounted for free rotation on the shaft 33 and respectively meshing with gears 65, 66, 67 and 68 keyed on shaft 69. A clutch-member 70 is splined on shaft 33 and has clutch-teeth at its opposite ends adapted to be selectively engaged with clutch-teeth of one or the other of gears 61, 62. Another clutch-member 71 is splined on shaft 33 between gears 63 and 64 and has clutch-teeth at its opposite ends adapted to be selectively engaged with corresponding clutch-teeth on one or the other of gears 63, 64. The clutch-member 70 is operated through linkage 72 and the clutch-member 71 is operated through linkage 73, operation being accomplished by a hand-lever 74 (Figs. 4 and 5) which is adapted to be engaged in one or the other of notches 75, 76 of the linkage 72 or 73. Thus, by bringing into action one or the other of pairs of gears 61 and 65, 62 and 66, 63 and 67, 64 and 68, any one of four different speeds can be given to the shaft 69.

Gear 67 on shaft 69 is also in mesh with a gear 77 (Fig. 6) above it, which gear 77 is keyed to a shaft 78 having a worm 35 secured or formed on shaft 78. The worm 35 meshes with worm-wheel 36 which is keyed on shaft 37 (Figs. 6 and 7). Shaft 37 has a flywheel 80 keyed thereto and is rotatably mounted in bearings 81, 82 and 83. Keyed to shaft 37, between bearings 82 and 83, is an eccentric gear 84 (Figs. 7 and 8) which meshes with an eccentric gear 85 which in turn is keyed on a shaft 86 mounted in bearings 87 and 88. A shaft 89 is mounted in bearings 90 and 91 in axial alignment with shaft 86. An eccentric gear 92 is keyed on shaft 89 and meshes with another eccentric gear 93, which is keyed on a shaft 94 mounted in bearings 95 and 96.

Friction-clutch or coupling 97 has coupling-members 98, 99 respectively keyed on the axially-aligned shafts 86 and 89. Nuts 100 and 101 are respectively threaded on the ends of shafts 86 and 89 to ensure the proper securement of coupling-members 98 and 99 upon these shafts. Shaft 86 may have sufficient longitudinal play for coupling and uncoupling action by any suitable provision, such as the bearings 87 and 88 being capable of having longitudinal movement with coupling-member 98 toward and from the coupling-member 99. The left end of shaft 89 has a collar 102 threaded thereon and locked in position in any suitable way, as for example, by means of the pin 103.

A long coupling-operating or locking screw 104 has its end 105 threadedly engaged with the shaft 86 and has an annular flange 106 adapted to either engage against the end of shaft 89 or against the inner surface 107 of the collar 102, depending upon which direction the locking-screw 104 is turned by engagement of a wrench or other suitable tool with the square end 108 of the screw. By turning the screw 104 in one direction, the flange 106 engages against the end of shaft 89 and the shaft 86 and the coupling-member 98 are drawn toward the coupling-member 99 to clutch or couple the members 98 and 99 together, to cause the shafts 86 and 89 to be capable of rotation as a single shaft. By turning the screw 104 in the opposite direction, the flange 106 engages against the surface 107 of the collar 102, and in unscrewing from the shaft 86, forces the latter, with the coupling-member 98, away from engagement with the coupling-member 99, thus permitting any desired angular adjustment to be made between the coupling-members 98 and 99, prior to again securing them in coupled or locked position.

At the left end of the shaft 94 is fixed a collar 109 having external coupling-teeth 110 meshing with internal coupling-teeth 111 formed in an axially-movable coupling-ring 112. The said coupling-ring 112 is also provided with external coupling-teeth 113 which releasably engage internal coupling-teeth 114 formed within the right-hand member 115 of a housing, generally designated by the reference character 116, and including, also, a complemental left-hand member 117 rigidly connected to the member 115, just referred to. The member 117 is also provided with internal coupling-teeth 118 which mesh into external coupling-teeth 119 formed upon the periphery of a collar 120 which is rigidly mounted upon the right end of the shaft 121 of the top cutter-carrier or roll 28.

By engaging any suitable or known operating-means with the annular groove 122 of the movable coupling-ring 112, the latter may be slid to the left to disengaging the gear-teeth 113 and 114, whereupon the shaft 94 may be rotated relatively to the shaft-end 121 to secure a desired angular adjustment between parts 94 and 121, after which the coupling-ring 112 is slid to the right to again engage the teeth 113, 114, so that the shaft 94 and shaft-end 121 of the cutter-roll 28 will be in driving and driven relation.

Gears 123 and 124 (Fig. 4) are respectively secured to the other ends of the top and bottom rolls 28 to drive the bottom roll from the top roll. The top roll 28 is provided with a square end 125, whereby the position of the rolls 28 can be rotationally adjusted when the coupling-ring 112 and housing 116 are disengaged.

While the coupling-ring 112 and housing 116 can be adjusted at small rotational intervals, ordinarily it is sufficient for present purposes to merely adjust this coupling into one or the other of positions 180° apart.

Assuming that the cutters 126, 127 (Fig. 10) are in cutting position and that the friction-coupling 97 and the coupling comprising the parts 109 to 120 inclusive are in engaged positions, by referring to Figs. 7 and 8, it will be seen that the eccentric gear 84 is in the position to drive the meshing gear 85 of this pair at maximum speed at the particular position shown. And it will also be seen that the gear 92 is in corresponding position to drive the gear 93 of the second pair at maximum speed at the position shown. Therefore, the two sets of gears 84, 85 and 92, 93 will cause the shaft 94 and the rolls 28 driven thereby to have considerably greater angular velocity at the position of the gears shown, than the angular velocity or rotational speed of the shaft 37 which rotates at uniform speed. But as the pairs of eccentric gears change their position during rotation, it will be seen by referring to Fig. 8 that as the gears rotate from the position shown in Fig. 8, the distance of the meshing teeth of gear 84 from their axis of rotation, or what may for convenience be called the "pitch radius", decreases, while the pitch radius of the gear 85 increases, and that this changing relationship continues until the gears 84 and 85 have moved through a rotational angle of 180°. Thus, it will be seen that in the gears moving from their position shown in Fig. 8 to a rotational position 180° therefrom, the speed of the gear 85 decreases from a maximum to a minimum. Similarly, the gears 92 and 93 of the other pair of gears decrease from a maximum to a minimum, so that when the two pairs of gears have moved 180° from the position illustrated in Figs. 7 and 8, the shaft 94 and cutter-rolls 28 are moving at their minimum angular velocity, which is less than the angular velocity of the uniformly-rotating shaft 37. Thus, it will be seen that with the eccentric gears in the position of adjustment shown in Figs. 7 and 8, the shaft 94 and the cutter-rolls 28 are given a surging motion which has the maximum and minimum at 180° apart.

As will be hereinafter set forth, it is possible to adjust the two sets of eccentric gears to any of various positions, so that instead of the cutter-rolls being given a maximum surge at the time of cut, they will be given a minimum surge at the time of cut, or any of different degrees of surge between maximum and minimum, or they can be given a uniform angular or rotational speed having no surge, which uniform rotational speed will be intermediate between the maximum surge that can be given and the minimum surge that can be given.

Ordinarily, the stock 128 (Fig. 3) which may, for example, be sheet-metal, is given a speed of feed to give the highest feasible rate of output of sheared lengths of stock, and ordinarily this speed of feed is constant. In other words, the motor 20 is ordinarily driven at a constant speed of rotation, and through the pairs of upper and lower feed-rolls 27 and pairs of upper and lower flattening-rolls 129 which are driven from the motor 20 through drive-bars 26 in a usual and well-known way, gives a constant speed of feed to the stock 128.

The stock 128 is fed between the upper and lower cutter-rolls to be cut by the cutters or knives 126 and 127. If the cutter-rolls 28, at the instant the cutters make the cut, should be going faster or slower than the speed of feed of the stock 128, there would be a tendency for the stock to be damaged. Therefore, it is important to have the speed of travel of the cutters at the instant of cut the same as the speed of feed of the stock.

Inasmuch as the stock 128 is fed at constant speed, the only way in which stock can be cut into various of selected desired lengths, is to change the average angular velocity, or average rate of rotation, or the number of rotations or revolutions of the cutter-rolls in a given unit of time. Thus, if the cutter-rolls have a given average speed at a particular time, the stock will be cut into pieces of a given uniform length. If, now, the average speed of the rolls is doubled, so that twice the number of rotations of the rolls occur in a given interval of time, then the lengths of stock being cut will be half of what they formerly were.

Let it be assumed that it is desired to cut the stock into pieces of such a length as will be cut when the cutter-rolls 28 rotate at uniform speed with no surge. As this length of cut will be accomplished when the rolls have an intermediate number of revolutions in a given unit of time, such one or another of the intermediate pairs of gears of the gear-change mechanism 34 will be brought into action (Figs. 1 and 5) as will be proper, and the infinitely-variable speed-change unit 39 will be given such adjustment as to get the exact speed of rotation of the rolls 28 that is necessary for making the speed along the pitch circle of the cutters equal to the speed of feed of the stock to be cut.

The action of the speed-changing unit 39 is such that the worm 56 is rotated at such a speed and in such a direction as to let off or permit the differential-housing 49 to rotate, thereby changing the speed relationship between the shafts 31 and 33, which shafts would have the same speed in opposite directions if the housing 49 were held against rotation. But, when the worm 56 is rotated to permit a backing-off action, the speed of the shaft 33 will be decreased, thus permitting of securing an infinitely-fine variation in the speed of rotation of the shaft 33, and consequently of the rolls 28. But, in order to cause the rolls 28 to rotate at uniform angular velocity at all points of their rotation, it is necessary to adjust the two sets of gears to a different position from that shown in Figs. 1, 7, 11 and 12. This adjustment will now be described.

By placing the end of a lever or bar (not shown) in one or another of holes 130 of the flywheel 131 secured on shaft 69, the mechanism can be rotated by hand to bring the cutters 126 and 127 into cutting position. When brought to this position, the collar 102 will have the same rotational position that it has in Figs. 3, 7, 9, 10, 11 and 12, and which for convenience is indicated by the letter "A". The locking-screw 104 is now loosened to free the coupling-members 98 and 99, whereupon the flywheel 131 is rotated again by hand to move the mechanism until the first pair of gears 84 and 85 are moved through, say, 180° to the position shown in Figs. 9 and 10. It will thus be seen that the pair of gears 84 and 85 are adjusted to exactly counteract the eccentric action of the pair of gears 92 and 93, whereupon the screw 104 is rotated to lock the coupling-members 98 and 99 together. Thus, the two pairs of gears neutralize one another and cause the shaft 94 to be rotated at the same uniform angular speed at which shaft 37 is rotated, and, therefore, the cutter-rolls 28 will be rotated at uniform angular speed.

If it be now desired to cut the stock into pieces of a longer length, the first thing to do will be to bring into action by one or the other of clutch-members 70 or 71 such of the pairs of change-gears of the gear-change mechanism 34 as will cause the rolls 28 to rotate the nearest to the slower average speed that is necessary to give the longer cut, and the final exact adjustment of the average speed of rotation of the rolls 28 is obtained by suitable adjustment of the infinitely-variable speed-change unit 39. But, inasmuch as the speed of feed of the stock continues at all times at a constant speed, the speed of rotation of the rolls 28 is now too slow to synchronize with the speed of feed of the stock and, therefore, it will be necessary to introduce a surge into the rolls to increase their speed of movement at the particular instant that the cut is being made. This will be accomplished by leaving the gears 92 and 93 in their previous position shown in Figs. 1, 7, 9, 10, 11 and 12, and adjusting the gears 84 and 85 to the position shown in Figs. 1, 7, 11 and 12. The exact angular adjustment of the gears 84 and 85, which will be needed to give exactly the proper degree of surge, will be found by loosening screw 104 and rotating the flywheel 131 by hand until the proper one of the length of cut markings 132 on the flywheel 80 comes in line with the indicator-finger 133 (Figs. 3 and 4), whereupon the gears 84 and 85 are secured in their set position by means of the locking-screw 104.

If it be now desired to cut the stock into pieces of a length shorter than that which is cut when the cutter-rolls 28 are rotating at uniform speed in the settings shown in Figs. 9 and 10, then such one or other of clutch-members 70 or 71 is actuated as will bring such of the pairs of change-gears of the gear-change mechanism 34 into action as will cause the rolls 28 to rotate nearest to the higher average speed that is necessary to give the shorter cut, and the final exact adjustment of the average speed of rotation of the rolls 28 is obtained by suitable adjustment of the infinitely-variable speed-change unit 39. But inasmuch as the speed of feed of the stock continues at all times at a constant speed, the speed of rotation of the rolls 28 is now too fast to synchronize with the speed of feed of the stock and, therefore, it will be necessary to introduce a slowing-up movement or slow surge into the rolls to decrease their speed of movement at the particular instant that the cut is being made. This is accomplished by rotating the flywheel 131 to bring the cutters 126 and 127 into cutting position, after which the coupling-members 112 and 116 are released and the flywheel 131 is again rotated to shift the gears 92 and 93 180° to the opposite position shown in Figs. 13, 14, 15 and 16, this position being indicated by the letter "B" showing on top of the part 102.

The screw 104 is now released to uncouple the coupling-members 98 and 99, whereupon the flywheel 131 is again rotated to bring the gears 84 and 85 into some such adjusted position as shown in Figs. 15 and 16, which will cause the cutter-rolls 28 to be rotated at something approaching their slowest speed at the time of cut.

Preferably, the various synchronizing adjustments are accomplished by utilizing the accelerating arc-portion of the driving-gear 84 to drive the gear 85 at the time of cut, so the upper roll 28 and its gear 123 (Fig. 4) are accelerating at the time of cut, and preferably also during a further interval, to avoid backlash between the gears 123 and 124 to keep the edges of the cutters 126 and 127 close together to produce the best and cleanest cut, and also to have the cutters get out of the way of the stock being fed.

When the eccentric gears are adjusted to give the cutter-rolls a uniform speed of rotation for making an intermediate length of cut, the mechanism runs with the least stress upon it, inasmuch as the heavy cutter-rolls 28 have uniform angular velocity. But when it is necessary to adjust the eccentric gears to any of the positions necessary to introduce a surge into the cutter-rolls in order to synchronize the speed of the cutters with the speed of the feed at the time of cut, then the heavy cutter-rolls introduce variable stresses into the drive. In order to counteract the effect of these surges, mechanism is illustrated in the diagrammatic modified construction shown in Fig. 2 having an eccentric gear 134 secured on a shaft 135 and in mesh with the eccentric drive-gear 84. Another pair of eccentric gears 136 and 137 are respectively secured on shafts 138 and 139, and friction-coupling members 140 and 141, similar to friction-coupling members 98 and 99, are provided to adjustably connect the axially-aligned shafts 135 and 138, in a similar manner to that in which shafts 86 and 89 are connected. The shaft 139 has a flywheel 142 secured thereon.

All of the eccentric gears 84, 85, 92, 93, 134, 136 and 137 are identical. Preferably, all bearings are anti-friction, such as roll or ball bearings. Thus, it will be seen by an examination of the construction shown in Fig. 2, that by releasing the coupling-members 140, 141, 98 and 99, and rotating the flywheel 131 by hand to a proper position of adjustment to synchronize the speed of the cutter-rolls and the stock, and by turning the flywheel 142 by hand to position the eccentric gears 136, 137 in exactly opposite relation to the eccentric gears 92, 93, and then again locking the coupling-members 140, 141, and 98, 99, and since the eccentric drive-gear 84 rotates the eccentric gears 85 and 134 correspondingly, but in opposite relationship at all times, when the speed of the cutter-rolls 28 are increasing to maximum surge during the cutting operations, the speed of the counterbalancing flywheel 142 is decreasing to minimum surge, and vice versa. And when such adjustment is made that the cutter-rolls 28 rotate at uniform speed, then the counterbalancing flywheel 142 will also rotate at uniform speed.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A flying cutting device, comprising: cutter-carrier means provided with cutter-means; feed-means adapted to feed stock to said cutter-means; driving-means for driving said cutter-carrier means to cause said cutter-means to cut said stock while it is being fed; said driving-means including two pairs of eccentric-gears and speed-changing means in series; adjustable coupling-means for changing the angular relationship between the two pairs of eccentric-gears; and other adjustable coupling-means for changing the angular relationship at the time of cut, between the cutter-carrier means and the eccentric-gear nearest thereto, to synchronize the speed of travel of said cutter-means with the speed of feed of the stock, at the time of cut.

2. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including two pairs of eccentric-gears and speed-changing means in series; adjustable coupling-means for changing the angular relationship between the two pairs of eccentric-gears; and other adjustable coupling-means for changing the angular relationship at the time of cut, between the cutter-carriers and the eccentric-gear, nearest thereto, to synchronize the speed of travel of said cutters with the speed of feed of the stock, at the time of cut.

3. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including two pairs of eccentric-gears and speed-changing means in series with a gear of each pair mounted on a separate shaft, both shafts being coaxial; adjustable coupling-means interposed between said coaxial shafts for changing the angular relationship between said gears on said coaxial shafts, and other adjustable coupling-means for changing the angular relationship at the time of cut, between the cutter-carriers and the eccentric-gear nearest thereto, to synchronize the speed of travel of said cutters with the speed of feed of the stock, at the time of cut.

4. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including a drive-shaft in driving relation with one of said cutter-carriers and two pairs of eccentric-gears and speed-changing means in series with a gear of each pair mounted on a separate shaft, both shafts being coaxial; and adjustable coupling-means interposed between said drive-shaft and the cutter-carrier it drives and other adjustable coupling-means interposed between said coaxial shafts for changing the angular relationship between said drive-shaft and the cutter-carrier it drives and between said gears on said coaxial shafts to synchronize the speed of travel of said cutters with the speed of feed of the stock, at the time of cut.

5. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including a drive-shaft in driving relation with one of said cutter-carriers and two pairs of eccentric-gears and speed-changing means in series with a gear of each pair mounted on a separate shaft, both shafts being coaxial; and adjustable coupling-means interposed between said drive-shaft and the cutter-carrier it drives and other adjustable coupling-means interposed between said coaxial shafts for changing the angular relationship between said drive-shaft and the cutter-carrier it drives and between said gears on said coaxial shafts to synchronize the speed of travel of said cutters with the speed of feed of the stock, at the time of cut; and the two other gears of said pairs of gears both being located at the same side of said coaxial shafts.

6. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including two pairs of eccentric-gears and speed-changing means in series; and adjustable coupling-means for changing the angular relationship between certain of said eccentric-gears, and adapted to be adjusted to cause said cutter-carriers to be rotated at uniform angular speed and also adapted to be adjusted to cause said cutter-carriers to be rotated at non-uniform angular speed having a maximum greater than, and a minimum less than, said uniform angular speed to synchronize the speed of travel of said cutters with the speed of feed of the stock, at the time of cut.

7. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including a drive-shaft in driving relation with one of said cutter-carriers and two pairs of eccentric-gears and speed-changing means in series with a gear of each pair mounted on a separate shaft, both shafts being coaxial; and adjustable coupling-means interposed between said drive-shaft and the cutter-carrier it drives and other adjustable coupling-means interposed between said coaxial shafts for changing the angular relationship between said drive-shaft and the cutter-carrier it drives and between said gears on said coaxial shafts, and adapted to be adjusted to cause said cutter-carriers to be rotated at uniform angular speed and also adapted to be adjusted to cause said cutter-carriers to be rotated at non-uniform angular speed having a maximum greater than, and a minimum less than, said uniform angular speed to synchronize the speed of travel of said cutters with the speed of feed of the stock, at the time of cut.

8. A flying cutting device, comprising: cutter-carrier means provided with cutter-means; feed-means adapted to feed stock to said cutter-means; driving-means for driving said cutter-carrier means to cause said cutter-means to cut said stock while it is being fed; said driving-means including two pairs of eccentric-gears and speed-changing means in series, said eccentric-gears being adapted to cause said cutter-carrier means to be driven with a non-uniform motion; and adjustable coupling-means for changing the angular relationship between certain of said eccentric-gears to synchronize the speed of travel of said cutter-means with the speed of feed of the stock, at the time of cut; counterbalance-means; and adjustable eccentric-gear means in driving relation with said counterbalance-means and adapted to drive the latter with a non-uniform motion of opposite character to that of the cutter-carrier means.

9. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including two pairs of eccentric-gears and speed-changing means in series, said eccentric-gears being adapted to cause said cutter-carriers to be rotated with a non-uniform motion; and adjustable coupling-means for changing the angular relationship between certain of said eccentric-gears to synchronize the speed of travel of said cutters with the speed of feed of the stock, at the time of cut; counterbalance-means; and adjustable eccentric-gear means in driving relation with said counterbalance-means and adapted to rotate the latter with a non-uniform motion of opposite character to that of the cutter-carriers.

10. A flying cutting device, comprising: a pair of rotatably-mounted cutter-carriers; a pair of cooperating cutters, one mounted on each cutter-carrier; feed-means adapted to feed stock to said cutters; driving-means for rotating said cutter-carriers to cause said cutters to cut said stock while it is being fed; said driving-means including two pairs of eccentric-gears and speed-changing means in series, said eccentric-gears being adapted to cause said cutter-carriers to be rotated with a non-uniform motion; and adjustable coupling-means for changing the angular relationship between certain of said eccentric-gears to synchronize the speed of travel of said cutters with the speed of feed of the stock, at the time of cut; counterbalance-means; and adjustable eccentric-gear means driven from one of said eccentric-gears and in driving relation with said counterbalance-means and adapted to rotate the latter with a non-uniform motion of opposite character to that of the cutter-carriers.

KARL W. HALLDEN.